US011902756B2

(12) United States Patent
Mendel et al.

(10) Patent No.: US 11,902,756 B2
(45) Date of Patent: *Feb. 13, 2024

(54) DIRECTIONAL DETECTION AND ACKNOWLEDGMENT OF AUDIO-BASED DATA TRANSMISSIONS

(71) Applicant: LISNR, Cincinnati, OH (US)

(72) Inventors: Oz Mendel, Piedmont, CA (US); William Knauer, Bellevue, KY (US)

(73) Assignee: LISNR, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,206

(22) Filed: Jul. 7, 2022

(65) Prior Publication Data

US 2022/0345815 A1    Oct. 27, 2022

Related U.S. Application Data

(63) Continuation of application No. 16/746,211, filed on Jan. 17, 2020, now Pat. No. 11,418,876.

(51) Int. Cl.
| | | |
|---|---|---|
| *H04R 3/00* | (2006.01) | |
| *H04R 1/40* | (2006.01) | |
| *H04R 29/00* | (2006.01) | |

(52) U.S. Cl.
CPC ............. *H04R 3/005* (2013.01); *H04R 1/406* (2013.01); *H04R 29/005* (2013.01)

(58) Field of Classification Search
CPC ....... H04R 3/005; H04R 1/406; H04R 29/005
(Continued)

(56) References Cited

U.S. PATENT DOCUMENTS

| 6,931,134 B1 | 8/2005 | Waller, Jr. et al. |
| 9,299,364 B1 | 3/2016 | Pereira et al. |

(Continued)

FOREIGN PATENT DOCUMENTS

JP    2019049685    3/2019

OTHER PUBLICATIONS

Cho et al., "An acoustic data transmissions system based on audio data hding: method and performance evaluation." EURASIP Journal on Aidio, Speech, and Music Processing 2015.1(2015); 1-14. Apr. 18, 2015; retrieved on Mar. 13, 2021 from <https://link.springer.com/article/10.1186/s13636-015-0053-x>, 15 pages.

(Continued)

*Primary Examiner* — Vivian C Chin
*Assistant Examiner* — Con P Tran
(74) *Attorney, Agent, or Firm* — NORTON ROSE FULBRIGHT US LLP

(57) ABSTRACT

Systems and methods for detecting and acknowledging audio transmissions containing data. In one embodiment, a method is presented that includes receiving multiple audio signals that are detected by multiple receivers from within a service area. A first audio transmission may be detected in a first subset of the audio signal that are received by a first subset of the receivers. The first subset of the receivers may be positioned to receive audio transmissions from computing devices located within a first portion of the service area. At least one transmitter may be identified that is positioned to transmit audio transmissions to computing devices located within at least a subset of the first portion of the service area. A second audio transmission may be transmitted using the at least one first transmitter.

20 Claims, 10 Drawing Sheets

(58) Field of Classification Search
USPC ............. 381/309, 122, 92, 91, 97, 56, 58; 73/645; 455/41.1, 41.2; 700/94; 370/464, 351, 395.1
See application file for complete search history.

(56) References Cited

U.S. PATENT DOCUMENTS

| | | | |
|---|---|---|---|
| 11,418,876 B2* | 8/2022 | Mendel | ............... H04R 1/406 |
| 2002/0147594 A1 | 10/2002 | Duncan | |
| 2003/0212549 A1 | 11/2003 | Steentra et al. | |
| 2005/0255843 A1 | 11/2005 | Hilpisch et al. | |
| 2007/0094009 A1 | 4/2007 | Ryu et al. | |
| 2007/0127311 A1 | 6/2007 | Garcia-Osuna et al. | |
| 2008/0281586 A1 | 11/2008 | Florencio et al. | |
| 2008/0304360 A1 | 12/2008 | Mozer | |
| 2012/0262531 A1 | 10/2012 | Sylvian | |
| 2013/0183944 A1 | 7/2013 | Mozer et al. | |
| 2013/0262198 A1 | 10/2013 | Chung | |
| 2014/0172141 A1 | 6/2014 | Mangold | |
| 2014/0192622 A1 | 7/2014 | Rowe et al. | |
| 2014/0364075 A1 | 12/2014 | Sullivan | |
| 2015/0113094 A1 | 4/2015 | Williams et al. | |
| 2016/0148618 A1 | 5/2016 | Huang et al. | |
| 2016/0269128 A1 | 9/2016 | Gautama et al. | |
| 2016/0323668 A1 | 11/2016 | Abraham et al. | |
| 2017/0026740 A1 | 1/2017 | Kirsch et al. | |
| 2017/0070250 A1 | 3/2017 | Kundmann et al. | |
| 2017/0085112 A1 | 3/2017 | Leabman | |
| 2017/0111738 A1 | 4/2017 | Murray et al. | |
| 2017/0279542 A1 | 9/2017 | Knauer et al. | |
| 2017/0329002 A1 | 11/2017 | Koreber et al. | |
| 2018/0035222 A1 | 2/2018 | Anderson | |
| 2018/0132298 A1 | 5/2018 | Bimam et al. | |
| 2018/0143292 A1 | 5/2018 | Przbyla et al. | |
| 2018/0174584 A1* | 6/2018 | Chih | ............... F16M 11/10 |
| 2018/0269554 A1 | 9/2018 | Sanford | |
| 2018/0295241 A1* | 10/2018 | Cartwright | ............ H04M 3/568 |
| 2019/0090052 A1 | 3/2019 | Radmanesh et al. | |
| 2019/0141311 A1 | 5/2019 | Lee et al. | |
| 2019/0222070 A1 | 7/2019 | Leabman | |
| 2020/0227039 A1 | 7/2020 | Liu et al. | |

OTHER PUBLICATIONS

International Search Report and Written Opinion corresponding to related International Application No. PCT/ US2021/013679, dated Apr. 9, 2021, 10 pages.

International Search Report and Written Opinion corresponding to related International Application No. PCT/ US2021/013637, dated Apr. 9, 2021, 28 pages.

International Search Report for International Application No. PCT/US21/13669 dated Mar. 31, 2021 (18 pages).

Smartavi, "RK*-JDK-ULT", smartavi.com, 2018, retrieved Feb. 22, 2021 from <URD:https://smartavi.com/rk8-hdx-ull/>, 6 pages.

* cited by examiner

DIRECTIONAL DETECTION AND ACKNOWLEDGMENT OF AUDIO-BASED DATA TRANSMISSIONS

CROSS-REFERENCE TO RELATED APPLICATIONS

The present application is a Continuation application of U.S. patent application Ser. No. 16/746,211 filed on Jan. 17, 2020, the disclosure of which is incorporated herein by reference for all purposes.

BACKGROUND

Data often needs to be transmitted between computing devices without connecting both devices to the same computing network. For example, in certain applications, a computing network may not exist near the computing devices, or it may be too cumbersome (e.g., may take too long) to connect one or both of the computing devices to a nearby computing network. Therefore, data may be transmitted directly from one computing device to another computing device.

SUMMARY

The present disclosure presents new and innovative systems and method for detecting and acknowledging audio transmissions containing data. In a first aspect, a method is provided that includes receiving multiple audio signals detected by multiple receivers, the multiple receivers positioned to receive audio transmissions from computing devices located within a service area. The method may also include detecting a first audio transmission in a first subset of the audio signals, the first subset of the audio signals being received by a first subset of the receivers positioned to receive audio transmissions from computing devices located within a first portion of the service area. The method may further include identifying, from among multiple transmitters positioned to transmit audio transmissions to computing devices located within a service area, at least one first transmitter positioned to transmit audio transmissions to computing devices located within at least a subset of the first portion of the service area. A second audio transmission may be transmitted using the at least one first transmitter.

In a second aspect according to the first aspect, identifying the at least one speaker further includes identifying a second subset of the audio signals that correspond to a second subset of the receivers that are located closest to a first source of the first audio transmission, the second subset of the receivers positioned to receive audio transmissions from computing devices within a second portion of the service area, wherein the second portion of the service area is contained within the first portion of the service area. The at least one first transmitter is positioned to transmit audio transmissions to computing devices located within at least a subset of the second portion of the service area.

In a third aspect according to the second aspect, the at least one first transmitter is identified, from among the multiple transmitters, as the at least one first transmitter located closest to the second subset of the receivers.

In a fourth aspect according to any of the first through third aspects, identifying the second subset of the receivers further includes determining, for each audio signal of the first subset of the audio signals, a detection time of the first audio transmission.

In a fifth aspect according to the fourth aspect, the second subset of the receivers is identified to include a first receiver corresponding to a first audio signal with the earliest detection time.

In a sixth aspect according to the fifth aspect, the method further includes calculating, a time difference between the earliest detection time and the detection times for the first subset of the audio signals other than the first audio signal. The second subset of the receivers may be identified to further include receivers corresponding to the audio signals of the first subset of the audio signals with time differences less than a predetermined threshold.

In a seventh aspect according to the sixth aspect, the predetermined threshold is less than or equal to 50 milliseconds.

In an eighth aspect according to any of the first through seventh aspects, the method further includes detecting a third audio transmission in a third subset of the audio signals, the third subset of the audio signals being received by a third subset of the receivers positioned to receive audio transmissions from computing devices located within a third portion of the service area. The method may also include identifying, from among the multiple transmitter, at least one second transmitter positioned to transmit audio transmissions to computing devices located within a subset of the third portion of the service area. A fourth audio transmission may be transmitted using the at least one first transmitter.

In a ninth aspect according to the eighth aspect, the third audio transmission is detected within one second of detecting the first audio transmission.

In a tenth aspect according to any of the eighth or ninth aspects, the first audio transmission and the third audio transmission are transmitted using the same carrier channel.

In an eleventh aspect according to any of the eighth through tenth aspects, the third subset of the receivers does not include any of the first subset of the receivers.

In a twelfth aspect according to any of the first through eleventh aspects, the second audio transmission includes an acknowledgment that the first audio transmission was received.

In a thirteenth aspect according to any of the first through twelfth aspects, detecting the first audio transmission in the first audio signal comprises detecting a second portion of the first audio transmission in the first audio signal, the first portion of the first audio transmission including a predetermined audio sequence.

In a fourteenth aspect according to the thirteenth aspect, the second portion of the first audio transmission is a preamble indicating the start of the first audio transmission.

In a fifteenth aspect, a system is provided that includes a processor and a memory. The memory may store instructions which, when executed by the processor, cause the processor to receive multiple audio signals detected by multiple receivers, the multiple receivers positioned to receive audio transmissions from computing devices located within a service area and detect a first audio transmission in a first subset of the audio signals, the first subset of the audio signals being received by a first subset of the receivers positioned to receive audio transmissions from computing devices located within a first portion of the service area. The memory may store further instructions which, when executed by the processor, cause the processor to identify, from among multiple transmitters positioned to transmit audio transmissions to computing devices located within a service area, at least one first transmitter positioned to transmit audio transmissions to computing devices located within at least a subset of the first portion of the service area.

The memory may store still further instructions which, when executed by the processor, cause the processor to transmit a second audio transmission using the at least one first transmitter.

In a sixteenth aspect according to the fifteenth aspect, the memory stores further instructions which, when executed by the processor while identifying the at least one speaker, cause the processor to identify a second subset of the audio signals that correspond to a second subset of the receivers that are located closest to a first source of the first audio transmission, the second subset of the receivers positioned to receive audio transmissions from computing devices within a second portion of the service area, wherein the second portion of the service area is contained within the first portion of the service area. The at least one first transmitter may be positioned to transmit audio transmissions to computing devices located within at least a subset of the second portion of the service area.

In a seventeenth aspect according to the sixteenth aspect, the at least one first transmitter is identified, from among the multiple transmitters, as the at least one first transmitter located closest to the second subset of the receivers.

In an eighteenth aspect according to any of the fifteenth through seventeenth aspect, the memory stores further instructions which, when executed by the processor while identifying the second subset of the receivers, cause the processor to determine, for each audio signal of the first subset of the audio signals, a detection time of the first audio transmission.

In a nineteenth aspect according to the eighteenth aspect, the second subset of the receivers is identified to include a first receiver corresponding to a first audio signal with the earliest detection time.

In a twentieth aspect according to the nineteenth aspect, the memory stores further instructions which, when executed by the processor, cause the processor to calculate, a time difference between the earliest detection time and the detection times for the first subset of the audio signals other than the first audio signal. The second subset of the receivers may be identified to further include receivers corresponding to the audio signals of the first subset of the audio signals with time differences less than a predetermined threshold.

In a twenty-first aspect according to any of the fifteenth through twentieth aspects, the memory stores further instructions which, when executed by the processor, cause the processor to detect a third audio transmission in a third subset of the audio signals, the third subset of the audio signals being received by a third subset of the receivers positioned to receive audio transmissions from computing devices located within a third portion of the service area. The memory may store further instructions which, when executed by the processor, cause the processor to identify, from among the multiple transmitter, at least one second transmitter positioned to transmit audio transmissions to computing devices located within a subset of the third portion of the service area and transmit a fourth audio transmission using the at least one first transmitter.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Aspects of the present disclosure relate to detecting and acknowledging received audio transmissions in a directional manner between computing devices. Techniques related to those discussed in the present disclosure are also discussed in U.S. application Ser. No. 16/746,134, filed on Jan. 17, 2020, and titled "MULTI-SIGNAL DETECTION AND COMBINATION OF AUDIO-BASED DATA TRANSMISSIONS" and U.S. application Ser. No. 16/746,187, filed on Jan. 17, 2020, and titled "AUDIO TRANSMITTER/RECEIVER ARRAY," the disclosures of which are herein incorporated by reference.

Various techniques and systems exist to exchange data between computing devices without connecting to the same communication network. For example, the computing devices may transmit data via direct communication links between the devices. In particular, data may be transmitted according to one or more direct wireless communication protocols, such as Bluetooth®, ZigBee®, Z-Wave®, Radio-Frequency Identification (RFID), Near Field Communication (NFC), and Wi-Fi® (e.g., direct Wi-Fi® links between the computing devices). However, each of these protocols relies on data transmission using electromagnetic waves at various frequencies. Therefore, in certain instances (e.g., ZigBee®, Z-Wave®, RFID, and NFC), computing devices may typically require specialized hardware to transmit data according to these wireless communication protocols. In further instances (e.g., Bluetooth®, ZigBee®, Z-Wave®, and Wi-Fi®), computing devices may typically have to be communicatively paired in order to transmit data according to these wireless communication protocols. Such communicative pairing can be cumbersome and slow, reducing the likelihood that users associated with one or both of the computing devices will utilize the protocols to transmit data.

Figure 1:
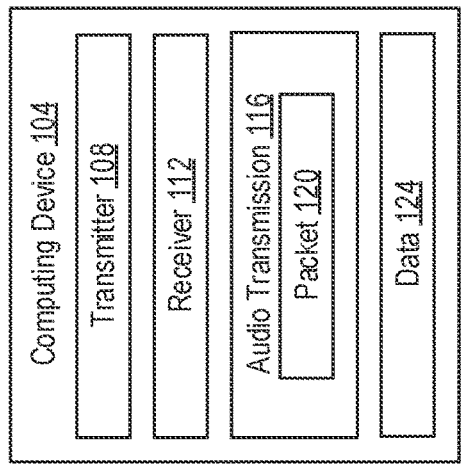
FIG. 1 illustrates a system according to an exemplary embodiment of the present disclosure.
Figure 1:
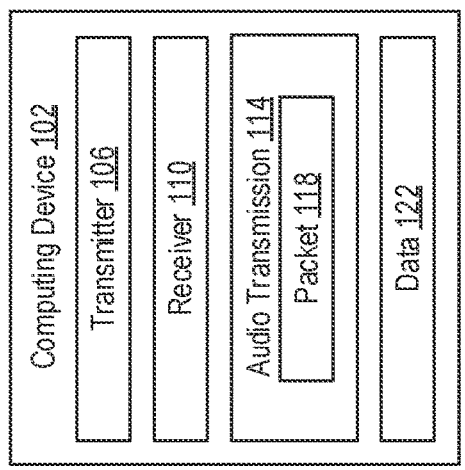

Therefore, there exists a need to wirelessly transmit data in a way that (i) does not require specialized hardware and (ii) does not require communicative pairing prior to data transmission. One solution to this problem is to transmit data using audio transmissions. For example, FIG. 1 illustrates a system 100 according to an exemplary embodiment of the present disclosure. The system 100 includes two computing devices 102, 104 configured to transmit data 122, 124 using audio transmissions 114, 116. In particular, each computing device 102, 104 includes a transmitter 106, 108 and a receiver 110, 112. The transmitters 106, 108 may include any type of device capable of generating audio signals, such as speakers. In certain implementations, the transmitters 106, 108 may be implemented as a speaker built into the computing device 102, 104. For example, one or both of the computing devices may be a smart phone, tablet computer, and/or laptop with a built-in speaker that performs the functions of the transmitter 106, 108. In other implementations, the transmitters 106, 108 may be implemented as a microphone external to the computing device 102, 104. For example, the transmitters 106, 108 may be implemented as one or more speakers externally connected to the computing device 102, 104.

The receivers 110, 112 may include any type of device capable of receiving audio transmissions and converting the audio transmissions into signals (e.g., digital signals) capable of being processed by a processor of the computing device, such as microphones. In other implementations, the receivers 110, 112 may be implemented as a microphone built into the computing device 102, 104. For example, one or both of the computing devices may be a smartphone, tablet computer, and/or laptop with a built-in microphone that performs the functions of the receivers 110, 112. In other implementations, the receivers 110, 112 may be implemented as a microphone external to the computing device 102, 104. For example, the receivers 110, 112 may be implemented as one or more microphones external to the computing device 102, 104 that are communicatively coupled to the computing device 102, 104. In certain implementations, the transmitter 106, 108 and receiver 110, 112 may be implemented as a single device connected to the computing device. For example, the transmitter 106, 108 and receiver 110, 112 may be implemented as a single device containing at least one speaker and at least one microphone that is communicatively coupled to the computing device 102, 104.

In certain implementations, one or both of the computing devices 102, 104 may include multiple transmitters 106, 108 and/or multiple receivers 110, 112. For example, the computing device 104 may include multiple transmitters 108 and multiple receivers 112 arranged in multiple locations so that the computing device 104 can communicate with the computing device 102 in multiple locations (e.g., when the computing device 102 is located near at least one of the multiple transmitters 108 and multiple receivers 112. In additional or alternative implementations, one or both of the computing devices 102, 104 may include multiple transmitters 106, 108 and/or multiple receivers 110, 112 in a single location. For example, the computing device 104 may include multiple transmitters 108 and multiple receivers 112 located at a single location. The multiple transmitters 108 and multiple receivers 112 may be arranged to improve coverage and/or signal quality in an area near the single location. For example, the multiple transmitters 108 and multiple receivers 112 may be arranged in an array or other configuration so that other computing devices 102 receive audio transmissions 114, 116 of similar quality regardless of their location relative to the transmitters 108 and receivers 112 (e.g., regardless of the location of the computing devices 102 within a service area of the transmitters 108 and receivers 112).

The computing devices 102, 104 may generate audio transmissions 114, 116 to transmit data 122, 124 to one another. For example, the computing devices 102 may generate one or more audio transmissions 114 to transmit data 122 from the computing device 102 to the computing device 104. As another example, the computing device 104 may generate one or more audio transmissions 116 to transmit data 124 from the computing device 104 to the computing device 102. In particular, the computing devices 102, 104 may create one or more packets 118, 120 based on the data 122, 124 (e.g., including a portion of the data 122, 124) for transmission using the audio transmissions 114, 116. To generate the audio transmission 114, 116, the computing devices 102, 104 may modulate the packets 118, 120 onto an audio carrier signal. The computing devices 102, 104 may then transmit the audio transmission 114, 116 via the transmitter 106, 108, which may then be received by the receiver 110, 112 of the other computing devices 102, 104. In certain instances (e.g., where the data 122, 124 exceeds a predetermined threshold for the size of a packet 118, 120), the data 122, 124 may be divided into multiple packets 118, 120 for transmission using separate audio transmissions 114, 116.

Accordingly, by generating and transmitting audio transmissions 114, 116 in this way, the computing devices 102, 104 may be able to transmit data 122, 124 to one another without having to communicatively pair the computing devices 102, 104. Rather, a computing device 102, 104 can listen for audio transmissions 114, 116 received via the receivers 110, 112 from another computing device 102, 104 without having to communicatively pair with the other computing device 102, 104. Also, because these techniques can utilize conventional computer hardware like speakers and microphones, the computing devices 102, 104 do not require specialized hardware to transmit the data 122, 124.

However, transmitting data by audio transmissions includes other limitations. In particular, audio transmissions are susceptible to types of interference and/or distortions that are either not present or less prevalent for data transmissions by electromagnetic signals. For instance, different frequencies utilized by the audio transmission may attenuate differently, causing certain frequencies to appear larger in magnitude when received by another computing device. Further, over longer distances, the magnitude of the audio transmission when received may decrease, reducing the signal-to-noise ratio for the received audio transmission. Additionally, accurately transmitting data using audio may require that audio transmissions be transmitted towards a receiving computing device. For example, if an audio transmission is not transmitted towards a computing device, the computing device may receive the audio signal with a lower magnitude, reducing the signal-to-noise ratio for the audio transmission. The computing device may also receive a reflection of the audio transmission instead of the audio transmission itself, which may increase the amount of interference (e.g., between different symbols of the same audio transmission) and/or may lower the magnitude and/or signal-to-noise ratio of the received audio transmission.

Therefore, there exists a need to transmit audio transmission towards computing devices intended to receive the audio transmissions. Typically, this problem may be addressed by transmitting an audio transmission in multiple directions (e.g., in all directions within a service area). However, such systems may interfere with other audio transmissions intended for different computing devices (e.g., computing devices located in different locations), as computing devices may receive two different audio transmissions and may attempt to combine the different audio transmissions. One solution to this problem is to determine a direction from which an audio transmission is received. The direction may be determined by identifying the receivers located closest to a source of the audio transmission. A corresponding transmitter may then be identified that transmits in the same direction as the source of the audio transmission. For example, the receivers located closest to the source of the audio transmission may be positioned to receive audio transmissions from a portion of a service area and the corresponding transmitter may be positioned to transmit audio transmissions to at least a subset of the portion of the service area.

Figure 2:
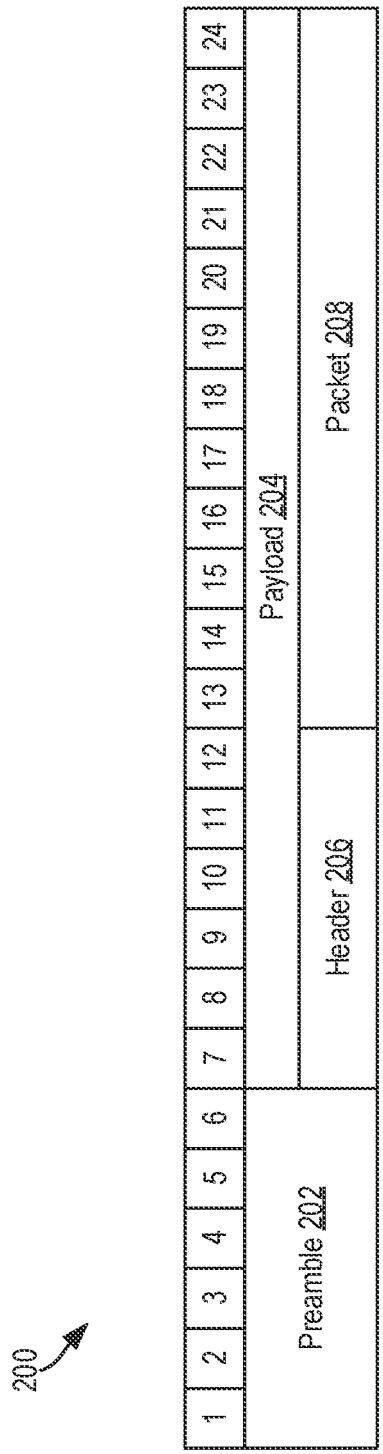
FIG. 2 illustrates an audio transmission according to an exemplary embodiment of the present disclosure.

FIG. 2 illustrates an audio transmission 200 according to an exemplary embodiment of the present disclosure. The audio transmission 200 may be used to transmit data from one computing device to another computing device. For example, referring to FIG. 1, the audio transmission 200 may be an example implementation of the audio transmissions 114, 116 generated by the computing devices 102, 104. The audio transmission 200 includes multiple symbols 1-24, which may correspond to discrete time periods within the audio transmission 200. For example, each symbol 1-24 may correspond to 2 ms of the audio transmission 200. In other examples, the symbols 1-24 may correspond to other time periods within the audio transmission 200 (e.g., 1 ms, 10 ms, 20 ms, 40 ms). Each symbol 1-24 may include one or more frequencies used to encode information within the audio transmission 200. For example, the one or more frequencies may be modulated in order to encode information in the audio transmission 200 (e.g., certain frequencies may correspond to certain pieces of information). In another example, the phases of the frequencies may be additionally or alternatively be modulated in order to encode information in the audio transmission 200 (e.g., certain phase differences from a reference signal may correspond to certain pieces of information).

In particular, certain symbols 1-24 may correspond to particular types of information within the audio transmission 200. For example, the symbols 1-6 may correspond to a preamble 202 and symbols 7-24 may correspond to a payload 204. The preamble 202 may contain predetermined frequencies produced at predetermined points of time (e.g., according to a frequency pattern). In certain implementations, the preamble 202 may additionally or alternatively contain frequencies (e.g., a particular predetermined frequency) whose phase differences are altered by predetermined amounts at predetermined points of time (e.g., according to a phase difference pattern). The preamble 202 may be used to identify the audio transmission 200 to a computing device receiving the audio transmission 200. For example, a receiver of the computing device receiving audio transmissions such as the audio transmission 200 may also receive other types of audio data (e.g., audio data from environmental noises and/or audio interference). The preamble 202 may therefore be configured to identify audio data corresponding to the audio transmission 200 when received by the receiver of the computing device. In particular, the computing device may be configured to analyze incoming audio data from the receiver and to disregard audio data that does not include the preamble 202. Upon detecting the preamble 202, the computing device may begin receiving and processing the audio transmission 200. The preamble may also be used to align processing of the audio transmission 200 with the symbols 1-24 of the audio transmission 200. In particular, by indicating the beginning of the audio transmission 200, the preamble 202 may enable the computing device receiving the audio transmission 200 to properly align its processing of the audio transmission with the symbols 1-24.

The payload 204 may include the data intended for transmission, along with other information enabling proper processing of the data intended for transmission. In particular, the packets 208 may contain data desired for transmission by the computing device generating the audio transmission 200. For example, and referring to FIG. 1, the packet 208 may correspond to the packets 118, 120 which may contain all or part of the data 122, 124. The header 206 may include additional information for relevant processing of data contained within the packet 208. For example, the header 206 may include routing information for a final destination of the data (e.g., a server external to the computing device receiving the audio transmission 200). The header 206 may also indicate an originating source of the data (e.g., an identifier of the computing device transmitting the audio transmission 200 and/or a user associated with the computing device transmitting the audio transmission 200).

The preamble 202 and the payload 204 may be modulated to form the audio transmission 200 using similar encoding strategies (e.g., similar encoding frequencies and/or phase differences). Accordingly, the preamble 202 and the payload 204 may be susceptible to similar types of interference (e.g., similar types of frequency-dependent attenuation and/or similar types of frequency-dependent delays). Proper extraction of the payload 204 from the audio transmission 200 may rely on proper demodulation of the payload 204 from an audio carrier signal. Therefore, to accurately receive the payload 204, the computing device receiving the audio transmission 200 must account for the interference.

Symbols 1-24 and their configuration depicted in FIG. 2 are merely exemplary. It should be understood that certain implementations of the audio transmission 200 may use more or fewer symbols, and that one or more of the preamble 202, the payload 204, the header 206, and/or the packet 208 may use more or fewer symbols than those depicted and may be arranged in a different order or configuration within the audio transmission 200.

Figure 3A:
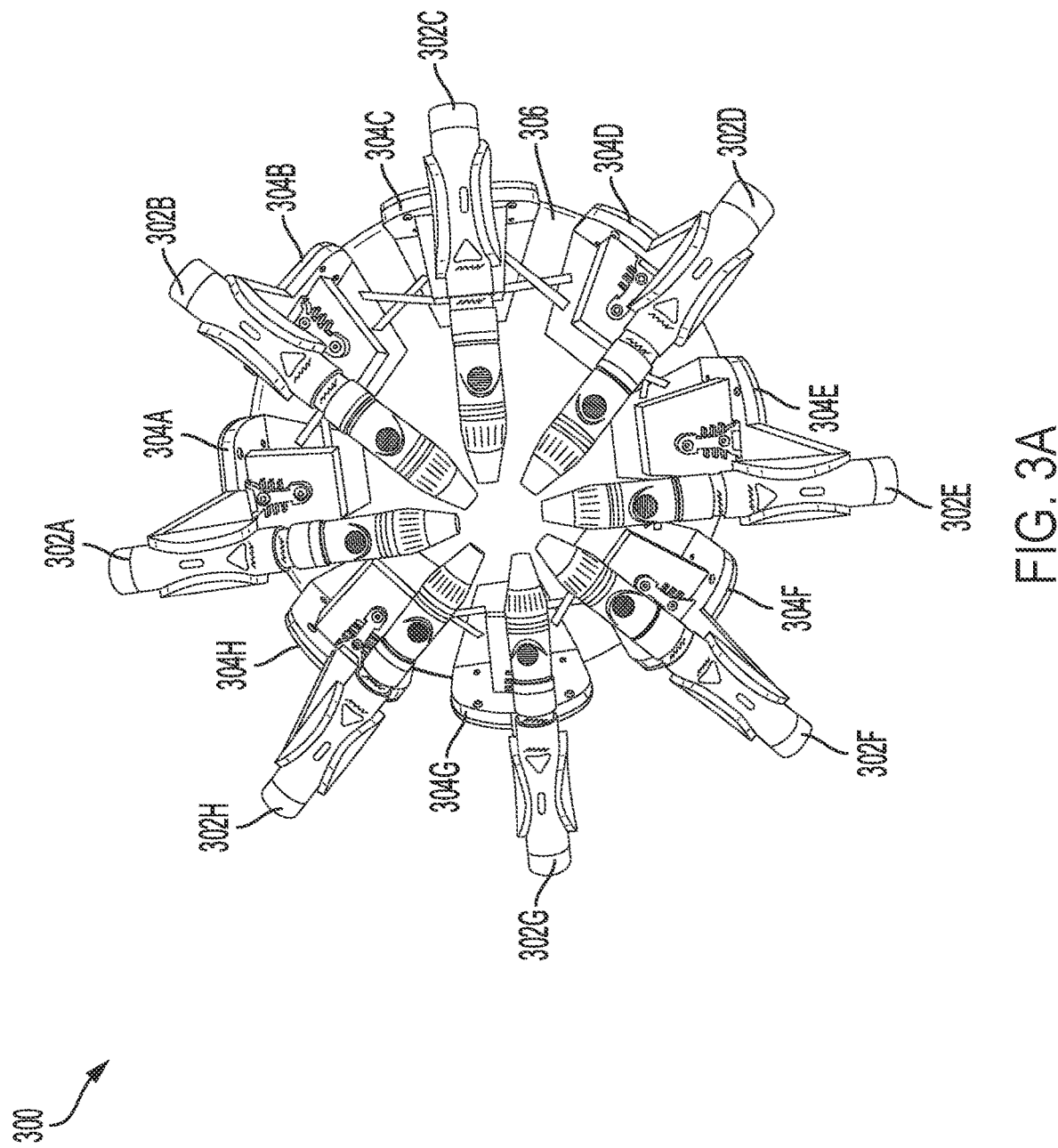
FIGS. 3A-3B illustrate transmitter/receiver array according to an exemplary embodiment of the present disclosure.
Figure 3B:
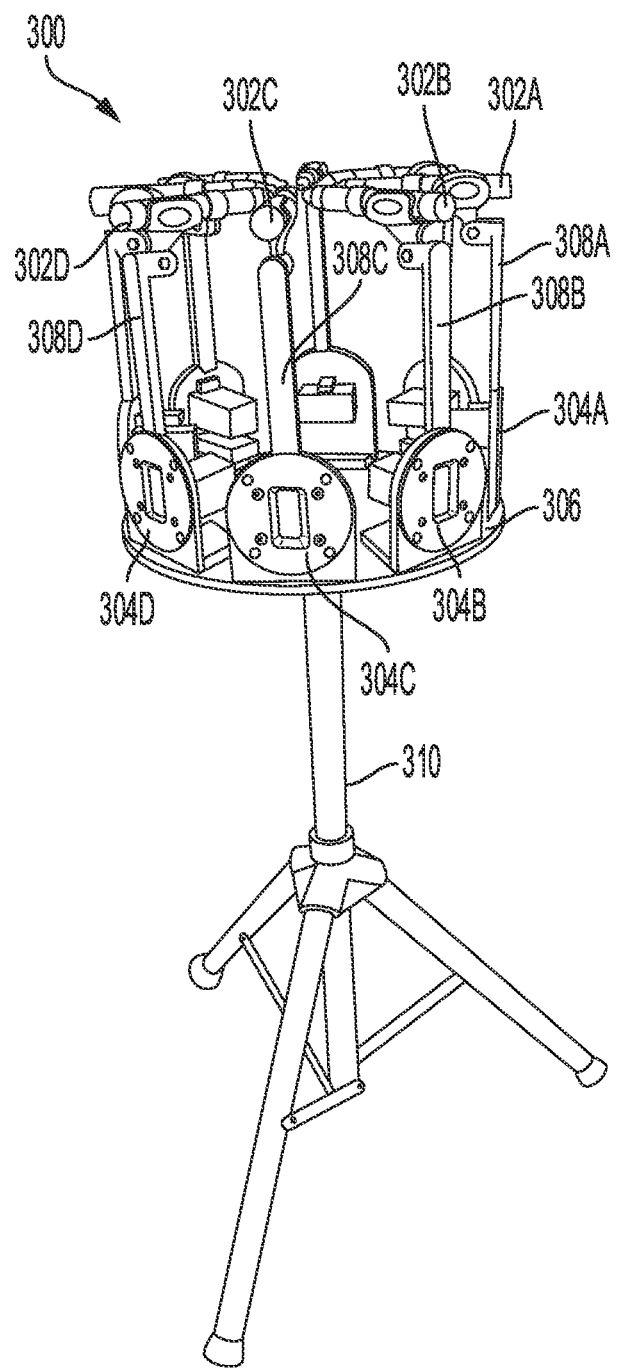

FIGS. 3A-3B illustrate a transmitter/receiver array 300 according to an exemplary embodiment of the present disclosure. The transmitter/receiver array 300 may be used to transmit and/or receive audio transmission 200. For example, the transmitter/receiver array 300 may be an exemplary implementation of at least one of the computing devices 102, 104. The transmitter/receiver array 300 includes eight receivers 302A-H and eight transmitters 304 A-H. Each of the eight receivers 302A-H may be exemplary implementations of the receivers 110, 112. For example, the eight receivers 302A-H may be implemented as microphones. Each of the eight transmitters 304A-H may be exemplary implementations of the transmitters 106, 108. For example, the eight transmitters 304A-H may be implemented as speakers.

As depicted, the receivers 302A-H and the transmitters 304A-H are arranged to evenly cover a 360° area surrounding the transmitter/receiver array 300. For example, the receivers 302A-H and transmitters 304A-H are arranged so that there is approximately 45° between adjacent receivers 302A-H and adjacent transmitters 304A-H. Such a configuration may enable the transmitter/receiver array 300 receive audio transmissions 200 from and transmit audio transmissions 200 to multiple directions within a coverage area of the transmitter/receiver array 300. For example, the transmitter/receiver array 300 may be configured to receive audio transmissions from multiple computing devices in different portions of a service area.

The receivers 302A-H and the transmitters 304A-H may be mounted on a support body 306. The support body 306 may allow the transmitter/receiver array 300 to be positioned and configured without altering the relative orientation of the receivers 302A-H and the transmitters 304A-H. In certain implementations, the receivers 302A-H may be mounted such that the receivers 302A-H are separated from the transmitters 304A-H (e.g., so that the receivers 302A-H can avoid interference from the transmitters 304A-H). For example, the receivers 302A-H may be mounted on structural members 308A-D (only a subset of which are depicted in FIG. 3B) that separate the receivers 302A-H from the transmitters 304A-H. In certain implementations, the transmitter/receiver array 300 may be mounted on a support element, such as the support element 310. The support element 310 may raise the transmitter/receiver array 300 from the ground such that the transmitter/receiver array 300 is at a height better suited to receiving and transmitting audio transmission 200 (e.g., at or between chest and waist height for a typical individual).

It should be appreciated that additional or alternative implementations of the transmitter/receiver array 300 are possible. For example, alternative implementations may have more or fewer transmitters and/or receivers and/or may have larger or smaller transmitters and/or receivers. As another example, alternative implementations may omit one or more of the support body 306, the structural members 308A-D, and/or the support elements 310. As yet another example, alternative implementations may further include a housing surrounding the transmitters 304A-H and/or receivers 302A-H.

Figure 4:
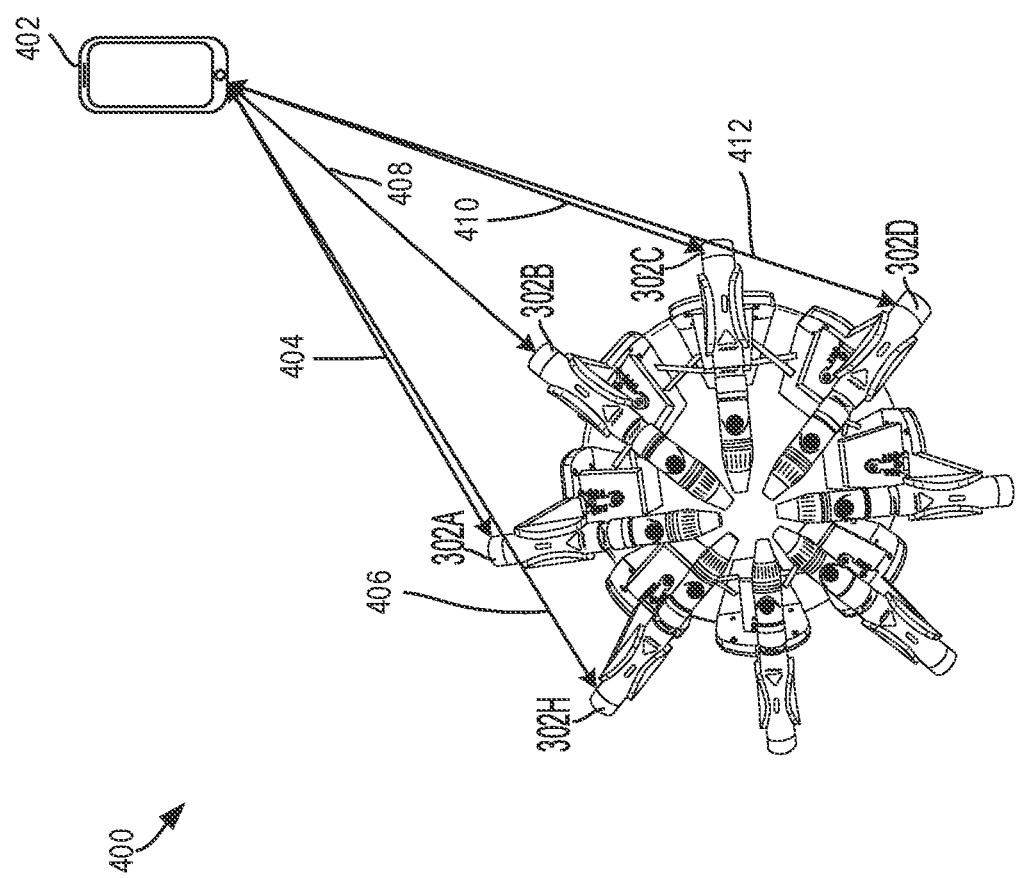
FIG. 4 illustrates a scenario according to an exemplary embodiment of the present disclosure.

FIG. 4 illustrates a scenario 400 according to an exemplary embodiment of the present disclosure. In the scenario 400, a computing device 402 is transmitting an audio transmission to the transmitter/receiver array 300. For example, the receivers 302A-D, 302H may receive the audio transmission from the computing device 402. However, due to the position of the computing device 402 relative to the transmitter/receiver array 300, the receivers 302A-D, 302H are different distances away from the computing device 402. For example, the distance 408 between the computing device 402 and the receiver 302B is shorter than the distances 404, 410 to the receivers 302A, 302C. The distances 406, 412 to the receivers 302H, 302D are even longer than the distances 404, 410. Because of these differences in distance, the receivers 302A-D, 302H may receive the audio transmission at different times.

Figure 5:
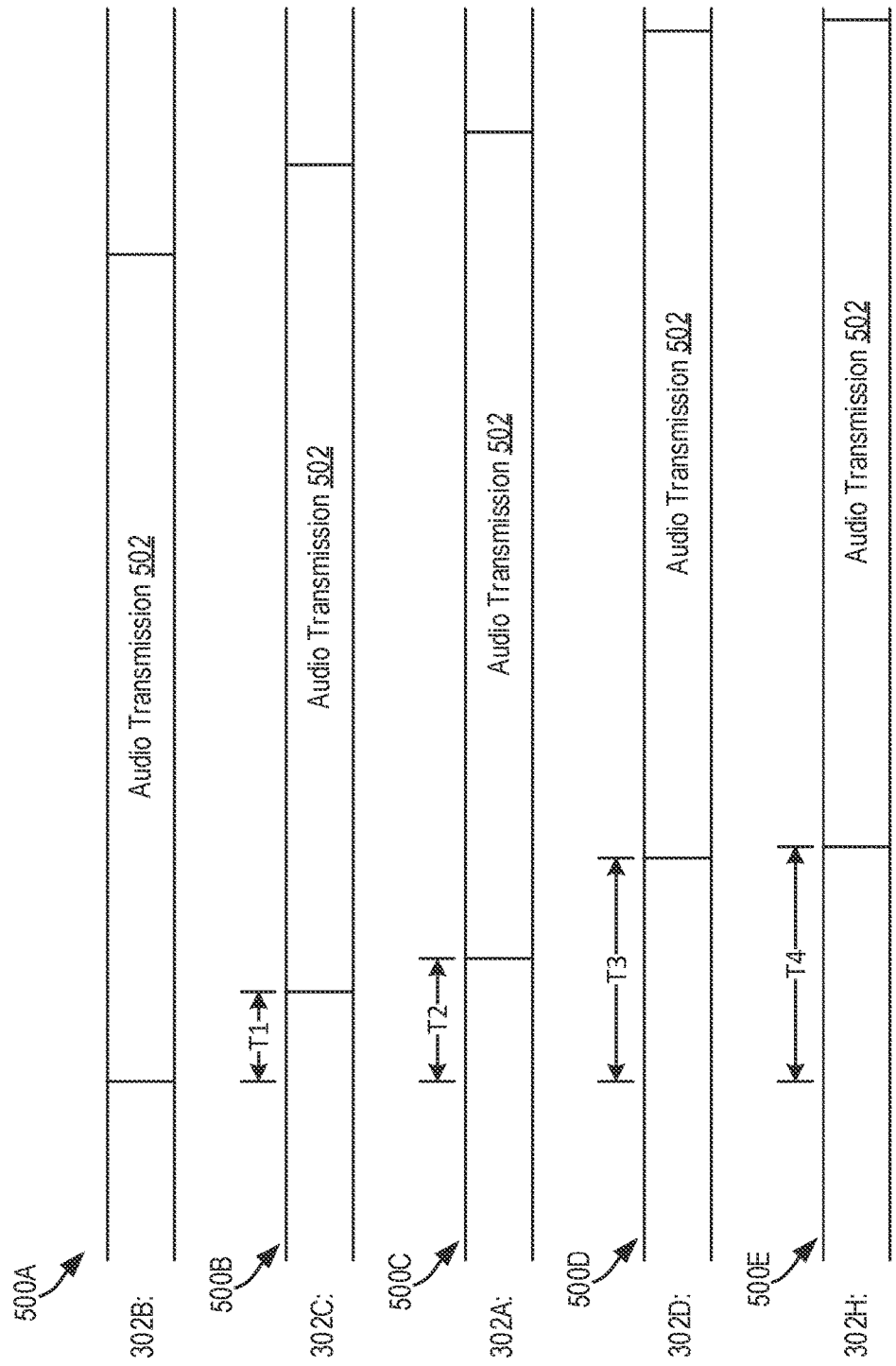
FIG. 5 illustrates received audio signals according to an exemplary embodiment of the present disclosure.

For example, FIG. 5 illustrates timing diagrams 500A-E of received audio signals according to an exemplary embodiment of the present disclosure. The timing diagrams may correspond to audio signals received by the receivers 302A-D, 302H. For example, as depicted, the timing diagram 500A may correspond to the receiver 302B, the timing diagram 500B may correspond to the receiver 302C, the timing diagram 500C may correspond to the receiver 302A, the timing diagram 500D may correspond to the receiver 302D, and the timing diagram 500E may correspond to the receiver 302H.

The timing diagrams 500A-E may depict a summary of the contents of the audio signals received by the receivers 302A-D, 302H over time. For example, the receivers 302A-D, 302H may regularly and/or constantly receive audio signals, including both audio transmissions 502 and other types of audio data (e.g., environmental noises or other noises). The audio signals may then be processed to detect audio transmissions 502 (e.g., by detecting a preamble or other portion of the audio transmission 520). Therefore, the timing diagrams 500A-E depict the time at which the audio transmission 502 (e.g., the audio transmission from the computing device 402) is detected in the audio signals received from the receivers 302A-D, 302H. In the timing diagram 500A, the audio transmission 502 is detected earliest in the audio signal from the receiver 302B. In the other timing diagrams 500B-E, the audio transmission 502 is detected at later times. In particular, the audio transmission 502 is detected in the audio stream from the receiver 302C at a time difference T1 after being detected in the audio stream from the receiver 302B. Similarly, the audio transmission 502 is detected in the audio stream from the receiver 302A at a time difference T2 after being detected in the audio stream from the receiver 302B. The audio transmission 502 is detected in the audio stream from the receiver 302D at a time difference T3 after being detected in the audio stream from the receiver 302B. Also, the audio transmission 502 is detected in the audio stream from the receiver 302H at a time difference T4 after being detected in the audio stream from the receiver 302B.

The time differences T1-T4 may depend on the difference in distance 404, 406, 408, 410, 412 between the computing device 402 and the corresponding receiver 302A-D, 302H from which an audio stream is received. For example, the receiver 302B is closest to the computing device 402 and the audio transmission 502 may therefore be detected first in the audio stream from the receiver 302B. Relatedly, the receiver 302C is the next closest receiver, so the audio transmission 502 is detected next in the audio transmission 502 at the time difference T1. Further, because the receiver 302A is closer than the receiver 302D, the time difference T2 is shorter than the time difference T3. Also, because the receiver 302D is closer than the 302H, the time difference T3 is shorter than the time difference T4.

Figure 6:
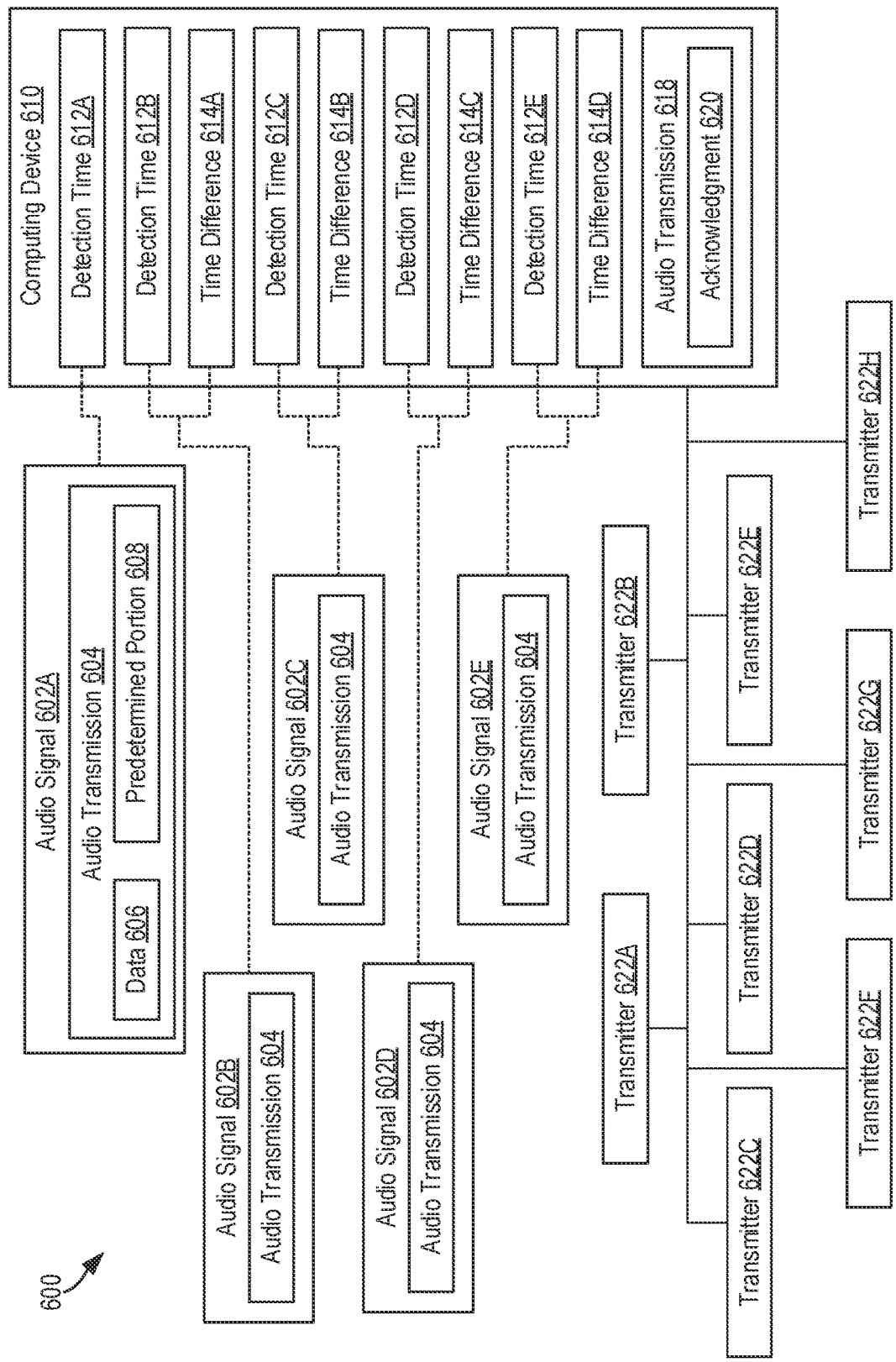
FIG. 6 illustrates a system according to an exemplary embodiment of the present disclosure.

FIG. 6 illustrates a system 600 according to an exemplary embodiment of the present disclosure. The system 600 may be configured to receive and process audio transmissions from multiple receivers and to utilize multiple transmitters to transmit audio transmissions to sources of the received audio transmissions. The system 600 includes a computing device 610, audio signals 602A-E, and transmitters 622A-H. The audio signals 602A-E may originate from multiple receivers. For example, the computing device 610 may be communicatively coupled to multiple receivers, such as receivers 302A-H of the transmitter/receiver array 300 and may receive the audio signals 602A-E from the receivers 302A-H. The audio signals 602A-E contain an audio transmission 604. The audio transmission 604 may be received from another computing device, such as the computing device 402. For example, a subset of the receivers 302A-H may receive the audio transmission 604, as in the scenario 400. The audio signals 602A-E originating from the subset of receivers may therefore contain the audio transmission 604. The audio transmission 604 may contain data 606 and a predetermined portion 608. For example, as discussed above in connection with the audio transmission 200, the audio transmission 604 may store data 606 in a payload 204 of the audio transmission 604, such as the packet 208. The predetermined portion 608 may correspond to a known, predetermined sequence. For example, the predetermined portion 608 may include a predetermined sequence of symbols (e.g., symbols containing a predetermined sequence of frequencies and/or phase differences). The predetermined portion 608 may identify the audio transmission 604 to the computing device 610. For example, the predetermined portion 608 may correspond to a preamble of the audio transmission 604, such as the preamble 202. The computing device 610 may therefore receive the audio signals 602A-H and may analyze the audio signals A-H for the predetermined portion 608. For example, the computing device 610 may, on an ongoing basis, compare a portion (e.g., a rolling buffer) of the incoming audio signals 602A-H to an expected sequence of audio that corresponds to the predetermined portion 608. Upon detecting the predetermined portion 608 in one of the audio signals 602A-E, the computing device 610 may determine that the audio signal 602A-E includes an audio transmission 604.

The computing device 610 may determine a detection time 612A-E for each audio signal 602A-E in which an audio transmission 604 is detected. The detection time 612A-E may indicate the time at which the detected audio transmission 604 was received by a receiver corresponding to the audio signal 602A-E in which the audio transmission 604 was received. For example, the detection time 612A-E may be determined as the starting time of the audio transmission 604 in each of the audio signals 602A-E. As explained above, depending on the relative positioning of the receivers corresponding to the audio signals 602A-E, the detection times 612A-E of the audio transmission 604 may differ for the audio signals 602A-E. The computing device 610 may compute time differences 614A-D for at least a subset of the audio signals 602A-E in which the audio transmission 604 is detected. For example, the detection time 612A may indicate that the audio transmission 604 was detected in the audio signal 602A earlier than being detected in the audio signals 602B-E. The computing device 610 may therefore calculate time differences 614A-D for the audio signals 602B-E with later detection times 612B-E. For example, as discussed above in connection with FIG. 4, the time differences 614A-D may be calculated as the difference between the earliest detection time 612A of the audio transmission 604 and the later detection times 612B-E corresponding to the audio signals 602B-E. As a specific example, the time difference 614A associated with the audio signal 602B may be calculated as the difference between the detection time 612A and the detection time 612B. Similarly, the time difference 614B associated with the audio signal 602C may be calculated as the difference between the detection time 612A and the detection time 612C. The time difference 614C associated with the audio signal 602D may be calculated as the difference between the detection time 612A and the detection time 612D. Further, the time difference 614D associated with the audio signal 602E may be calculated as the difference between the detection time 612A and the detection time 612E.

The detection times 612A-E and/or time differences 614A-D may be utilized to identify the direction from which an audio transmission 604 is received. For example, the detection times 612A-E and/or time differences 614A-D may be analyzed to identify which audio signals 602A-C originate from receivers located closest to a source of the audio transmission 604. In certain implementations, the audio signal 602A originating from the receiver located closest to the source of the audio transmission 604 may be identified as the audio signal 602A with the earliest detection time 612A of the audio transmission 604. In additional or alternative implementations, additional audio signals located near the source of the audio transmission 604 may be identified as receivers associated with a time difference 614A-D below a predetermined threshold. The predetermined threshold may be selected to ensure that only receivers located closely together are identified as the closest receivers. For example, the predetermined threshold may be selected to be 0.4 ms, although other implementations are possible (e.g., 0.2 ms, 0.5 ms, 1 ms). In certain implementations, the predetermined threshold may be adjusted to account for current operating conditions of the receivers and/or the computing device 610. For example, if the computing device 610 detects that the receivers are receiving many audio transmissions in addition to the audio transmission 604, the predetermined threshold may be lowered to reduce the number of receivers identified as closest to the source.

In response to detecting the audio transmission 604, the computing device 610 may generate an audio transmission 618 for transmission to the source of the audio transmission 604. For example, the audio transmission 618 may include an acknowledgment 620 for transmission to the source of the audio transmission 604 to indicate that the audio transmission 604 was successfully received. In certain implementations, the acknowledgment 620 may include an identifier of the audio transmission 604, such as a unique identifier included within the audio transmission 604 (e.g., a unique identifier of the audio transmission 604 and/or a computing device 402 that is the source of the audio transmission 604). In further implementations, the acknowledgment 620 may include performance information for a received audio transmission 604 (e.g., a signal-to-noise ratio for the audio transmission 604, a total processing time for the audio transmission 604). As another example, the audio transmission 618 may be generated in response to data 606 included within the audio transmission 604 (e.g., subsequent processing of the data 606). For example, the data 606 may include data for authentication of a user associated with the source of the audio transmission 604 and the audio transmission 618 may be transmitted to indicate that authentication using the data 606 was successful. In certain such implementations, the audio transmission 618 may not include an acknowledgment 620. In still further implementations, the computing device 610 may generate multiple audio transmission 618 in response to the received audio transmission 604. For example, the computing device 610 may initially generate an audio transmission 618 that includes an acknowledgment 620 upon detecting the audio transmission 604 and may subsequently generate an audio transmission in response to data 606 included within the audio transmission 604.

The transmitters 622A-H may be configured to transmit audio transmissions 618 generated by or received from the computing device 610. For example, the transmitters 622A-H may be exemplary implementations of the transmitters 106, 108, 304A-H and may be part of a transmitter/receiver array 300. In particular, the transmitters 622A-H may be positioned to transmit audio transmission 618 to a service area. For example, the transmitters 622A-H may be positioned to transmit audio transmissions 618 to a service area surrounding a transmitter/receiver array 300 that includes the transmitters 622A-H. Each transmitter 622A-H may transmit audio transmissions 618 a corresponding portion of the service area (e.g., may be positioned to face a corresponding portion of the service area). For example, the transmitters 622A-H may be evenly spaced, similar to the transmitters 304A-H in FIG. 3A, such that each transmitter 622A-H faces a corresponding portion of the service area that includes 45 degrees of the service area surrounding the transmitter/receiver array 300 (e.g., ⅛ of the service area).

The computing device 610 may transmit the audio transmission 618 using at least one of the transmitters 622A-H. For example, the computing device 610 may identify a transmitter 622A-H located closest to the source of the audio transmission 604. As a specific example, the transmitter 622A-H located closest to the source may be identified as the transmitter 622A-H positioned to transmit audio transmissions to computing devices located in the same direction as the source of the audio transmission. In particular, the receivers located closest to the source of the audio transmission 604 may be positioned to receive audio transmissions from a first portion of a service area and the transmitter 622A-H located closest to the source may be positioned to transmit audio transmissions to at least a subset of the first portion of the service area.

The computing device 610 may be implemented by a computing system. For example, although not depicted, the computing device 610 may contain a processor and a memory that implement at least one operational feature. For example, the memory may contain instructions which, when executed by the processor, cause the processor to implement at least one operational feature of the computing device 610.

Figure 7:
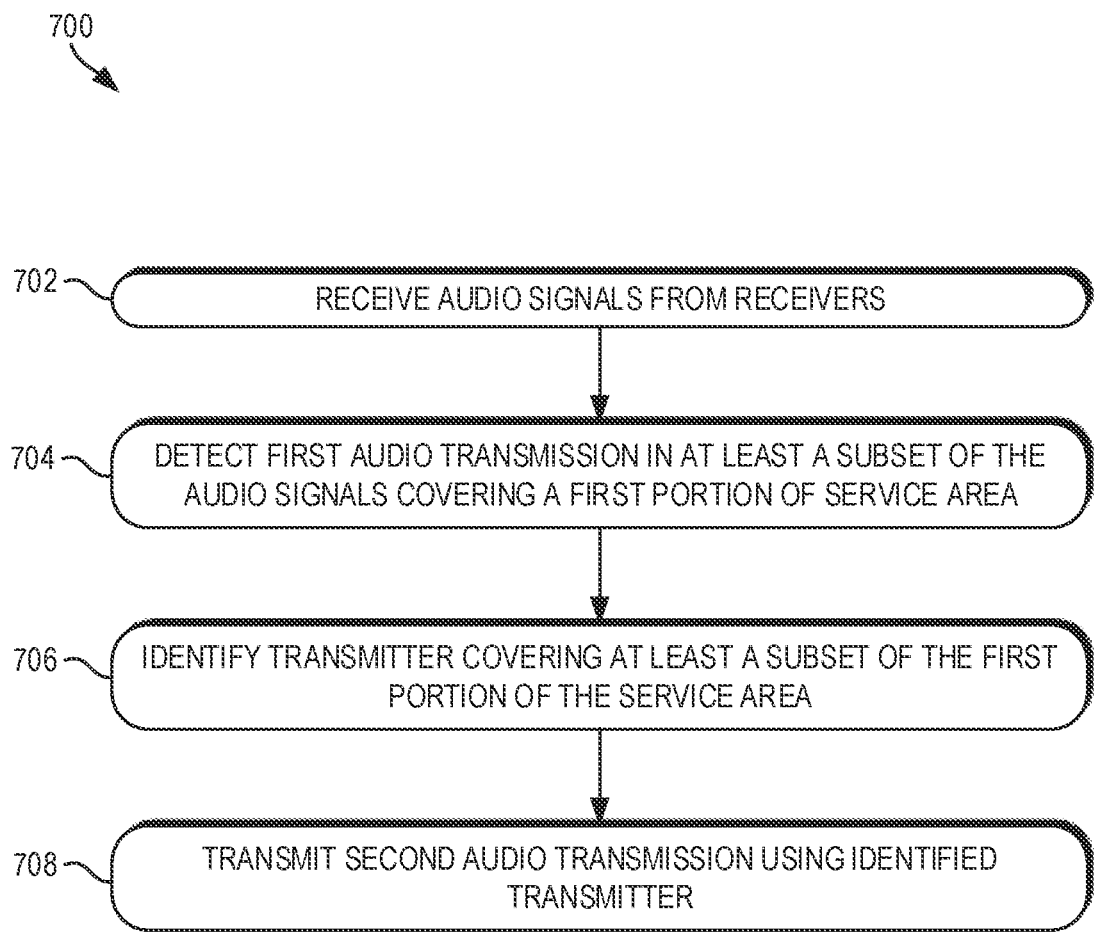
FIG. 7 illustrates a method according to an exemplary embodiment of the present disclosure.

FIG. 7 illustrates a method 700 according to an exemplary embodiment of the present disclosure. The method 700 may be performed to determine a direction from which an audio transmission received and to select transmitters for use to transmit audio transmissions in the same direction. The method 700 may be performed by a computer system, such as the system 600. For example, the method 700 may be implemented by the computing device 610. The method 700 may also be implemented by a set of instructions stored on a computer readable medium that, when executed by a processor, cause the computer system to perform the method 700. For example, all or part of the method 700 may be implemented by a processor and/or a memory of the computing device 610. Although the examples below are described with reference to the flowchart illustrated in FIG. 7, many other methods of performing the acts associated with FIG. 7 may be used. For example, the order of some of the blocks may be changed, certain blocks may be combined with other blocks, one or more of the blocks may be repeated, and some of the blocks described may be optional.

The method 700 may begin with receiving audio signals from receivers (block 702). For example, the computing device 710 may receive multiple audio signals 602A-H from multiple receivers. The receivers may be oriented in multiple directions, such as the receivers 302A-H of the transmitter/receiver array 300. In still further implementations, the receivers may be located in multiple locations (e.g., multiple locations within a service area).

An audio transmission may then be detected in at least a subset of the audio signals (block 704). For example, the computing device 610 may detect an audio transmission 604 in at least a subset of the audio signals 602A-E. In implementations where the audio signals 602A-E are received from multiple receivers, a subset of the receivers may receive an audio transmission 604 from a source, such as the computing device 402. The computing device 610 may therefore detect the audio transmission 604 in the subset of the audio signals 602A-E from the subset of receivers that received the audio transmission 604. As explained above, the computing device 610 may detect the audio transmission 604 in the subset of the audio signals 602A-E by detecting a predetermined portion 608 of the audio transmission 604, such as a preamble of the audio transmission 604. For example, the predetermined portion 608 may correspond to an expected sequence of symbols within the audio transmission 604 and the computing device 610 may compare the audio signals 602A-H (e.g., rolling samples of symbols from the audio signals 602A-H) with the expected sequence of symbols. The computing device 610 may detect the predetermined portion 608 within the audio signals 602A-E as a portion of the audio signals 602A-E that matches the expected sequence of symbols. Upon detecting the predetermined portion 608 in a subset of the audio signals 602A-E, the computing device 610 may determine that the subset of the audio signals 602A-E contain the audio transmission 604.

The subset of the audio signals 602A-E may correspond to a subset of receivers (e.g., a subset of receivers communicatively coupled to the computing device 610). For example, as explained above, the receivers may be oriented in multiple directions to receive audio transmissions from a service area (e.g., a service area surrounding a transmitter/receiver array 300). The subset of the receivers in which the audio transmission 604 is detected may be positioned to receive audio transmissions from a first portion of the service area. In certain implementations, the computing device 610 may further identify the subset of the audio signals 602A-E as coming from the receiver or subset of receivers located closest to a source of the audio transmission 604. Identifying the closest receivers is discussed further below in connection with FIG. 8 and the method 800.

A transmitter may be identified that covers at least a subset of the first portion of the service area (block 706). For example, the computing device 610 may identifier a transmitter that is positioned to transmit audio transmission 618 to computing devices located in at least a subset of the first portion of the service area. In certain implementations, the transmitter may be identified as a transmitter facing at least partially in the same direction as the receiver(s) from which the subset of the audio signals 602A-E were received. For example, in implementations such as those depicted in FIG. 3A, a transmitter/receiver array 300 may include the same number of receivers 302A-H and transmitters 304A-H. In such implementations, the receivers 302A-H and transmitters 304A-H may be positioned to face the same directions and each receiver 302A-H may have a corresponding transmitter 304A-H positioned in the same direction. In such implementations, the transmitter may be identified to include the corresponding transmitter for one or more of the receiver(s) from which the subset of the audio signals 602A-E were received. As another example, a transmitter/receiver array 300 may include the same number of receivers 302A-H and transmitters 304A-H, but the receivers 302A-H and transmitters 304A-H may not be positioned in the same directions. In such implementations, the transmitter may be identified to include the transmitter(s) located closest to the receiver(s) from which the subset of the audio signals 602A-E were received. For example, the receiver located closest to the source of the audio transmission 604 may be positioned between two transmitters, and the transmitter may be identified to include one or both of the transmitters. In still further implementations, the transmitter/receiver array 300 may include a different number of receivers 302A-H and transmitters 304A-H. In such implementations, the transmitter may be identified to include the transmitter(s) positioned to transmit audio transmissions to the largest subset of the first portion of the service area. Additionally or alternatively, the transmitter may be identified to include sufficient transmitter(s) to transmit to the entire first portion of the service area. For example, the transmitter may be identified to include the minimum number of transmitters required to transmit audio transmissions to the entire first portion of the service area. In still further implementations, the transmitter may be identified to include the transmitter located closest to the receiver(s) from which the subset of the audio signals 602A-E were received. In any of the above-discussed implementations, the computing device 610 may identify the transmitter using a mapping between receivers and the transmitters 622A-H. For example, depending on the desired selection, the mapping may identify one or more of the transmitter that faces the same direction as each receiver, the transmitter located closest to each receiver, and which combinations of transmitters are capable of transmitting audio transmissions to the entire portion of the service area corresponding to each receiver.

The computing device 610 may identify a single transmitter that covers at least a subset of the first portion of the service area and/or may identify multiple transmitters. For example, as described above, in certain implementations each receiver may have a single corresponding transmitter positioned to transmit audio transmissions in the same direction and, in other implementations, certain receivers may have more than one transmitter positioned to transmit audio transmissions in the same direction. Therefore, the number of transmitters identified may depend at least in part on the number of transmitters that correspond to each receiver. Additional or alternatively, the number of transmitters identified may depend on the number of receivers corresponding to the subset of audio signals 602A-E identified at block 704. For example, if a single audio signal 602A is identified at block 704 (e.g., the audio signal originating from the receiver located closest to the source of the audio transmission 604), the transmitter may be identified to include only the transmitter(s) corresponding to the receiver from which the single audio signal 602A is received. As another example, if multiple audio signals 602A-E are identified at block 704 (e.g., two audio signals with a small time difference), the transmitter may be identified to include the transmitter(s) (e.g., two transmitters) corresponding to the receivers (e.g., two receivers) from which the audio signals 602A-E were received.

A second audio transmission may then be transmitted using the identified transmitter (block 708). For example, the computing device 610 may transmit an audio transmission 618 using the transmitter identified in block 706. In implementations where a single transmitter is identified at block 706, the computing device 610 may transmit the audio transmission 618 using the single transmitter. In implementations where multiple transmitters are identified at block 706, the computing device 610 may transmit the audio transmission 618 using the multiple transmitters simultaneously and/or may alternate transmitting the audio transmission 618 using individual transmitters from the multiple identified transmitters. For example, the computing device 610 may first transmit the audio transmission 618 using a first transmitter and may then transmit the audio transmission 618 using a different transmitter from the multiple transmitters. By transmitting the audio transmission 618 using the identified transmitter, the computing device 610 can reduce the likelihood that a computing device other than the computing device 402 that is the source of the audio transmission 604 receives the audio transmission 618. Further, by only transmitting in the direction of the source of the audio transmission 604, the computing device 610 can reduce the effects of reflections and other distortions of the audio transmission 618 caused by transmitting the audio transmission 618 in other directions. In this way, the signal quality of the audio transmission 618 received by the source of the audio transmission 604 may be improved.

Further, because the audio transmission 618 is not transmitted in unnecessary directions, multiple computing devices can use the same communication channel (e.g., the same communication frequencies and/or phases). For example, the method 700 may be repeated to process multiple received audio transmissions, including multiple transmissions received at the same or similar times. For example, a first audio transmission may be received by a first set of receivers 302A-D, 302H from a source located closest to the receiver 302B and a second audio transmission may be received by a second set of receivers 302D-H from a source located closest to the receiver 302F. The first and second audio transmissions may be received at the same or similar times (e.g., within 1 second, 0.5 seconds, 0.1 seconds, 50 ms of one another). In such instances, the method 700 may be performed once for each of the first and second audio transmissions. Where the first and second audio transmissions are received from different directions, as in the preceding example, the subset of audio signals containing the first audio transmission may differ from the subset of audio signals containing the second audio transmission. For example, the method 700 may be performed to process the first audio transmission to identify the audio signals from the receivers 302A-C as containing the first audio transmission and may be performed to process the second audio transmission to identify the audio signals from the receivers 302E-G as containing the second audio transmission. Accordingly, the transmitters utilized to transmit the audio transmission 618 may also differ. For example, the computing device 610 may identify the transmitters 304A-C for use in transmitting the audio transmission 618 in response to the first audio transmission and may identify the transmitters 304E-G for use in transmitting the audio transmission 618 in response to the second audio transmission. In this way, the method 700 may enable the computing device 610 to distinguish between and respond to multiple audio transmissions that are received at same or similar times by transmitter/receiver arrays (e.g., the transmitter/receiver array 300). In this way, the overall communication throughput through the system 600 can be increased, as the computing device 610 may be able to communicate with additional computing devices without having to utilize additional communication channels.

Figure 8:
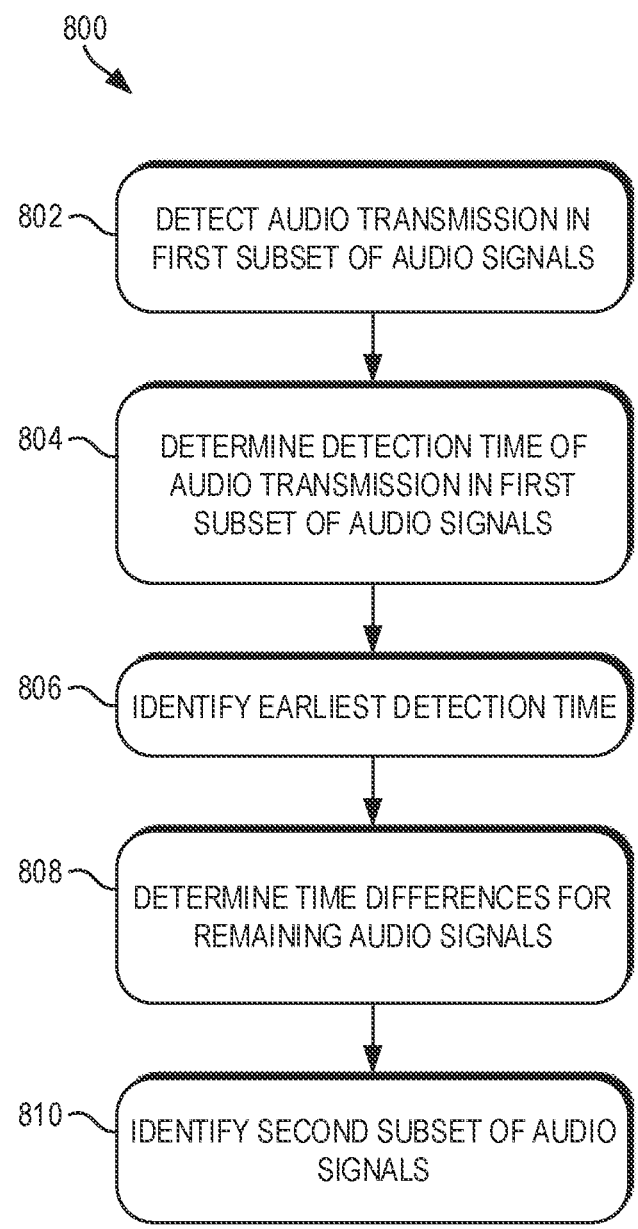
FIG. 8 illustrates a method according to an exemplary embodiment of the present disclosure.

FIG. 8 illustrates a method 800 according to an exemplary embodiment of the present disclosure. The method 800 may be performed to identify receivers located closest to the source of an audio transmission. For example, the method 800 may be performed to implement all or part of block 704 of the method 700. The method 800 may be implemented on a computer system, such as the computing device 610. The method 800 may also be implemented by a set of instructions stored on a computer readable medium that, when executed by a processor, cause the computer system to perform the method 800. For example, all or part of the method 800 may be implemented by a processor and/or memory contained within the computing device 610. Although the examples below are described with reference to the flowchart illustrated in FIG. 8, many other methods of performing the acts associated with FIG. 8 may be used. For example, the order of some of the blocks may be changed, certain blocks may be combined with other blocks, one or more of the blocks may be repeated, and some of the blocks described may be optional.

The method 800 may begin with detecting an audio transmission in a first subset of audio signals (block 802). For example, and as discussed further above in connection with the method 700 and the system 600, the computing device 610 may detect the audio transmission 604 in a first subset of audio signals 602A-E. In certain implementations, the computing device 610 may detect the audio transmission 604 by detecting a predetermined portion 608 of the audio transmission 604 in the first subset of audio signals 602A-E.

A detection time of the audio transmission may be determined for the first subset of audio signals (block 804). For example, the computing device 610 may determine a detection time 612A-E for each of the first subset of audio signals 602A-E. The detection time 612A-E for each of the first subset of audio signals 602A-E may indicate a time at which the audio transmission 604 is detected in the audio signal 602A-E, as discussed above. For example, the detection time 612A-E may be calculated as the time at which a predetermined portion 608 of the audio transmission 604 is detected within the audio signals 602A-E. In still further implementations, the detection time may be calculated to represent the beginning of the audio transmission 604 in the first subset of the audio signals 602A-E.

An earliest detection time may be identified (block 806). For example, the computing device 610 may identify an earliest detection time from among the detection times 612A-E for the first subset of the audio signals. For example, the audio signal 602A may include the audio transmission 604 at the earliest time and the detection time 612A may be earlier than the detection times 612B-E for the other audio signals 602B-E. Therefore, the computing device 610 may determine that the detection time 612A is the earliest detection time.

Time differences may then be determined for the remaining audio signals (block 808). For example, the computing device 610 may determine time differences 614A-D for the remaining audio signals 602B-E of the first subset of audio signals. The time differences 614A-D may be determined as the differences in detection times 612B-E for the audio signals 602B-E and the earliest detection time 612A. For example, the computing device 610 may calculate the time differences 614A-D as the difference between the detection times 612B-E and the earliest detection time 612A.

A second subset of audio signals may then be identified (block 810). For example, the computing device 610 may identify the second subset of audio signals. In particular, the computing device 610 may identify the second subset of the audio signals as the audio signals from the first subset of the audio signals that originate from the receivers located closest to the source of the audio transmission 604. As explained above in connection with FIGS. 4 and 5, the detection time 612A-E for each receiver may depend on the distance between the receiver and the source of the audio transmission 604. For example, in the timing diagram 500A, the audio transmission 502 is detected first in the audio signal from the receiver 302B because the receiver 302B is located closest to the computing device 402 that is the source of the audio transmission 502. Similarly, the time differences T1-T4 increase in the timing diagrams 500B-E as the receivers 302C, 302A, 302D, 302H increase in difference from the computing device 402.

Accordingly, the second subset of audio signals may be identified based on the time differences 614A-D. In certain implementations, the computing device 610 may identify the second subset of audio signals to include the audio signal 602A originating from the receiver located closest to the source of the audio transmission 604. For example, the second subset of audio signals may be identified to include a single audio signal 602A that originates from the receiver located closest to the source of the audio transmission 604. In particular, the computing device 610 may identify the audio signal 602A that originates from the receiver located closest to the source of the audio transmission 604 as the audio signal 602A with the earliest detection time 612A identified at block 806. In certain such implementations, block 808 may be omitted.

In certain implementations, and as discussed above, the computing device 610 may additionally or alternatively identify the second subset of the audio signals as the audio signals with a time difference less than a predetermined threshold (e.g., 0.4 ms). For example, in FIG. 5, the time difference T1 may be 0.2 ms, the time difference T2 may be 0.25 ms, the time difference T3 may be 0.45 ms, and the time difference T4 may be 0.47 ms. The computing device 610 may therefore identify the audio signals from the receivers 302C, 302A as part of the second subset of the audio signals because the time differences T1, T3 are less than the predetermined threshold of 0.4 ms, but may not identify the audio signals from the receivers 302D, 302H as part of the second subset of the audio signals because the time differences T3, T4 are greater than the predetermined threshold of 0.4 ms. Similarly, the audio signal from the receiver 302B may be identified as part of the second subset of audio signals because the audio transmission 502 is detected earliest in the audio signal from the receiver 302B. In certain implementations, at block 704, the first portion of the service area may be identified as the portion of the service area covered by the receivers corresponding to the second subset of audio signals (e.g., the portion of the service area from which the corresponding receivers are positioned to receive audio transmissions).

By performing the method 800, the computing device 610 may be able to accurately identify the second subset of audio signals that originate from receiver(s) located closest to the source of the audio transmission. As explained above in connection with the method 700, transmitters corresponding to the receiver(s) located closest to the source of the audio transmission may then be used to transmit an audio transmission 618 to the source of the audio transmission 604. By accurately identifying the subset of the audio signals, the method 800 improves the accuracy of the transmitter identified for transmission of the audio transmission 618, thereby improving the directionality of the transmission, which improves the quality of the audio transmission 618 received by the source and increases the number of computing devices that can use the same communication channel within the service area.

In additional or alternative implementations, the second subset of audio signals may be identified based on the magnitude of the audio transmission 604 detected in the audio signals 602A-E. For example, the computing device 610 may determine a magnitude (e.g., a root mean square magnitude, a maximum magnitude of a match filter used to identify the predetermined portion 608) of the portions of the first subset of the audio signals 602A-E containing the audio transmission 604 (e.g., the predetermined portion 608 of the audio transmission). In certain implementations, the magnitude may be determined instead of or in addition to determining the time differences at block 804. The second subset of the audio signals may then be identified as the audio signals containing the largest magnitude of the audio transmission 604. For example, the second subset of the audio signals may be identified as the audio signal with the largest magnitude of the audio transmission 604 and/or as the three audio signals with the three largest magnitudes of the audio transmission 604. The second subset of the audio signals closest to the source may additionally or alternatively be identified as the receivers whose magnitudes of the audio transmission 604 exceed a predetermined threshold. For example, the computing device 610 may identify the audio signal containing the largest magnitude of the audio transmission and may identify the second subset of the audio signals as the audio signal containing the largest magnitude of the audio transmission and any audio signals containing magnitudes of the audio transmission that exceed the predetermined threshold (e.g., 50%, 80%, 90% of the largest magnitude of the audio transmission).

Figure 9:
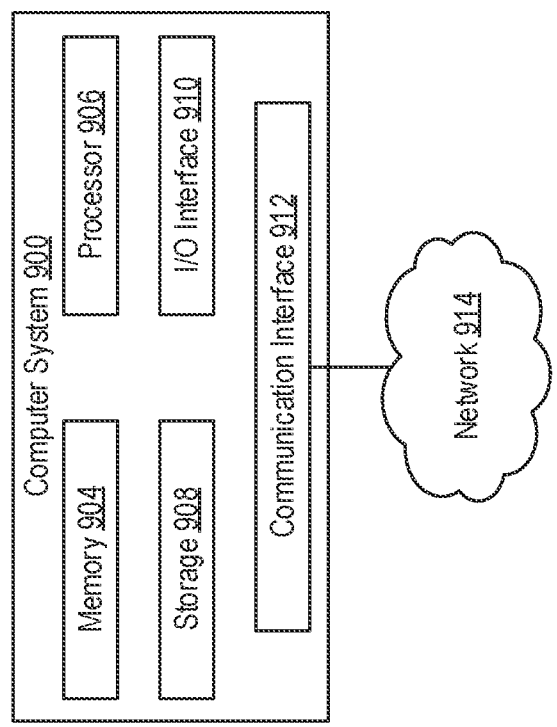
FIG. 9 illustrates a computing system according to an exemplary embodiment of the present disclosure.

FIG. 9 illustrates an example computer system 900 that may be utilized to implement one or more of the devices and/or components of FIG. 1, such as the computing devices 102, 104, 602. In particular embodiments, one or more computer systems 900 perform one or more steps of one or more methods described or illustrated herein. In particular embodiments, one or more computer systems 900 provide the functionalities described or illustrated herein. In particular embodiments, software running on one or more computer systems 900 performs one or more steps of one or more methods described or illustrated herein or provides the functionalities described or illustrated herein. Particular embodiments include one or more portions of one or more computer systems 900. Herein, a reference to a computer system may encompass a computing device, and vice versa, where appropriate. Moreover, a reference to a computer system may encompass one or more computer systems, where appropriate.

This disclosure contemplates any suitable number of computer systems 900. This disclosure contemplates the computer system 900 taking any suitable physical form. As example and not by way of limitation, the computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 906, memory 904, storage 908, an input/output (I/O) interface 910, and a communication interface 912. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 906 includes hardware for executing instructions, such as those making up a computer program. As an example and not by way of limitation, to execute instructions, the processor 906 may retrieve (or fetch) the instructions from an internal register, an internal cache, memory 904, or storage 908; decode and execute the instructions; and then write one or more results to an internal register, internal cache, memory 904, or storage 908. In particular embodiments, the processor 906 may include one or more internal caches for data, instructions, or addresses. This disclosure contemplates the processor 906 including any suitable number of any suitable internal caches, where appropriate. As an example and not by way of limitation, the processor 906 may include one or more instruction caches, one or more data caches, and one or more translation lookaside buffers (TLBs). Instructions in the instruction caches may be copies of instructions in memory 904 or storage 908, and the instruction caches may speed up retrieval of those instructions by the processor 906. Data in the data caches may be copies of data in memory 904 or storage 908 that are to be operated on by computer instructions; the results of previous instructions executed by the processor 906 that are accessible to subsequent instructions or for writing to memory 904 or storage 908; or any other suitable data. The data caches may speed up read or write operations by the processor 906. The TLBs may speed up virtual-address translation for the processor 906. In particular embodiments, processor 906 may include one or more internal registers for data, instructions, or addresses. This disclosure contemplates the processor 906 including any suitable number of any suitable internal registers, where appropriate. Where appropriate, the processor 906 may include one or more arithmetic logic units (ALUs), be a multi-core processor, or include one or more processors 906. Although this disclosure describes and illustrates a particular processor, this disclosure contemplates any suitable processor.

In particular embodiments, the memory 904 includes main memory for storing instructions for the processor 906 to execute or data for processor 906 to operate on. As an example, and not by way of limitation, computer system 900 may load instructions from storage 908 or another source (such as another computer system 900) to the memory 904. The processor 906 may then load the instructions from the memory 904 to an internal register or internal cache. To execute the instructions, the processor 906 may retrieve the instructions from the internal register or internal cache and decode them. During or after execution of the instructions, the processor 906 may write one or more results (which may be intermediate or final results) to the internal register or internal cache. The processor 906 may then write one or more of those results to the memory 904. In particular embodiments, the processor 906 executes only instructions in one or more internal registers or internal caches or in memory 904 (as opposed to storage 908 or elsewhere) and operates only on data in one or more internal registers or internal caches or in memory 904 (as opposed to storage 908 or elsewhere). One or more memory buses (which may each include an address bus and a data bus) may couple the processor 906 to the memory 904. The bus may include one or more memory buses, as described in further detail below. In particular embodiments, one or more memory management units (MMUs) reside between the processor 906 and memory 904 and facilitate accesses to the memory 904 requested by the processor 906. In particular embodiments, the memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory implementations, this disclosure contemplates any suitable memory implementation.

In particular embodiments, the storage 908 includes mass storage for data or instructions. As an example and not by way of limitation, the storage 908 may include a hard disk drive (HDD), a floppy disk drive, flash memory, an optical disc, a magneto-optical disc, magnetic tape, or a Universal Serial Bus (USB) drive or a combination of two or more of these. The storage 908 may include removable or non-removable (or fixed) media, where appropriate. The storage 908 may be internal or external to computer system 900, where appropriate. In particular embodiments, the storage 908 is non-volatile, solid-state memory. In particular embodiments, the storage 908 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 908 taking any suitable physical form. The storage 908 may include one or more storage control units facilitating communication between processor 906 and storage 908, where appropriate. Where appropriate, the storage 908 may include one or more storages 908. Although this disclosure describes and illustrates particular storage, this disclosure contemplates any suitable storage.

In particular embodiments, the I/O Interface 910 includes hardware, software, or both, providing one or more interfaces for communication between computer system 900 and one or more I/O devices. The computer system 900 may include one or more of these I/O devices, where appropriate. One or more of these I/O devices may enable communication between a person (i.e., a user) and computer system 900. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 910 may include one or more device or software drivers enabling processor 906 to drive one or more of these I/O devices. The I/O interface 910 may include one or more I/O interfaces 910, where appropriate. Although this disclosure describes and illustrates a particular I/O interface, this disclosure contemplates any suitable I/O interface or combination of I/O interfaces.

In particular embodiments, communication interface 912 includes hardware, software, or both providing one or more interfaces for communication (such as, for example, packet-based communication) between computer system 900 and one or more other computer systems 900 or one or more networks 914. As an example and not by way of limitation, communication interface 912 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 914 and any suitable communication interface 912 for the network 914. As an example and not by way of limitation, the network 914 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 900 may include any suitable communication interface 912 for any of these networks, where appropriate. Communication interface 912 may include one or more communication interfaces 912, where appropriate. Although this disclosure describes and illustrates a particular communication interface implementations, this disclosure contemplates any suitable communication interface implementation.

The computer system 902 may also include a bus. The bus may include hardware, software, or both and may communicatively couple the components of the computer system 900 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
receiving multiple audio signals detected by multiple receivers, the multiple receivers positioned in a first location to receive audio transmissions from computing devices located within corresponding portions of a service area;
detecting a first audio transmission in a first subset of the audio signals, the first subset of the audio signals being received by a first subset of the receivers positioned to receive audio transmissions from computing devices located within a first portion of the service area, wherein the first subset of the multiple receivers excludes at least one of the multiple receivers;
identifying, from among multiple transmitters positioned to transmit audio transmissions to computing devices located within a service area, at least one first transmitter positioned to transmit audio transmissions to computing devices located within at least a subset of the first portion of the service area; and
transmitting a second audio transmission using the at least one first transmitter.

2. The method of claim 1, wherein the at least one first transmitter is identified based on when the first audio transmission is detected within the first subset of the audio signals.

3. The method of claim 2, wherein identifying the at least one first transmitter comprises:
determining, for each audio signal of the first subset of the audio signals, a detection time of the first audio transmission.

4. The method of claim 3, further comprising:
determining an earliest detection time of the first audio transmission, wherein the earliest detection time occurs within a first audio signal from the first subset of the audio signals.

5. The method of claim 4, wherein the at least one first transmitter is selected to correspond to a first receiver that received a first audio signal.

6. The method of claim 4, further comprising:
calculating time differences between the earliest detection time of the first audio transmission and the detection times of the first audio transmission within the first subset of the audio signals other than the first audio signal; and
identifying, based on the time differences, a second subset of receivers that are located closest to a source of the first audio transmission.

7. The method of claim 6, wherein the second subset of receivers are identified to include receivers corresponding to the audio signals of the first subset of the audio signals with time differences less than a predetermined threshold.

8. The method of claim 7, wherein the predetermined threshold is less than or equal to 50 milliseconds.

9. The method of claim 6, further comprising processing the first audio transmission based on audio signals received by the second subset of receivers.

10. The method of claim 6, wherein the at least one first transmitter is selected to correspond to at least one of the second subset of receivers.

11. The method of claim 1, further comprising:
detecting a third audio transmission in a third subset of the audio signals, the third subset of the audio signals being received by a third subset of the receivers positioned to receive audio transmissions from computing devices located within a third portion of the service area;
identifying, from among the multiple transmitter, at least one second transmitter positioned to transmit audio transmissions to computing devices located within a subset of the third portion of the service area; and
transmitting a fourth audio transmission using the at least one first transmitter.

12. The method of claim 11, wherein the first audio transmission and the third audio transmission are transmitted using the same carrier channel.

13. The method of claim 11, wherein the third subset of the receivers does not include any of the first subset of the receivers.

14. The method of claim 11, wherein the multiple receivers are directional receivers configured to receive audio transmissions from a corresponding portion of the service area with an angle less than or equal to 180 degrees from the front of a respective directional receiver.

15. A system comprising:
a processor; and
a memory storing instructions which, when executed, cause the processor to:
receive multiple audio signals detected by multiple receivers, the multiple receivers positioned in a first location to receive audio transmissions from computing devices located within corresponding portions of a service area;
detect a first audio transmission in a first subset of the audio signals, the first subset of the audio signals being received by a first subset of the receivers positioned to receive audio transmissions from computing devices located within a first portion of the service area, wherein the first subset of the multiple receivers excludes at least one of the multiple receivers;
identify, from among multiple transmitters positioned to transmit audio transmissions to computing devices located within a service area, at least one first transmitter positioned to transmit audio transmissions to computing devices located within at least a subset of the first portion of the service area; and
transmit a second audio transmission using the at least one first transmitter.

16. The system of claim 15, wherein the at least one first transmitter is identified based on when the first audio transmission is detected within the first subset of the audio signals.

17. The system of claim 16, wherein the at least one first transmitter is selected to correspond to a first receiver that received a first audio signal with an earliest detection time of the first audio transmission.

18. The system of claim 15, wherein the instructions cause the processor to:
detect a third audio transmission in a third subset of the audio signals, the third subset of the audio signals being received by a third subset of the receivers positioned to receive audio transmissions from computing devices located within a third portion of the service area;
identify, from among the multiple transmitter, at least one second transmitter positioned to transmit audio transmissions to computing devices located within a subset of the third portion of the service area; and transmit a fourth audio transmission using the at least one first transmitter.

19. The system of claim 18, wherein the third subset of the receivers does not include any of the first subset of the receivers.

20. The system of claim 15, wherein the multiple receivers are directional receivers configured to receive audio transmissions from a corresponding portion of the service area with an angle less than or equal to 180 degrees from the front of a respective directional receiver.

* * * * *